United States Patent [19]

Sakata et al.

[11] E Patent Number: Re. 33,148

[45] Reissued Date of Patent: Jan. 16, 1990

[54] STRUT TYPE SUSPENSION FOR AUTOMOBILE

[75] Inventors: Mamoru Sakata, Ooizumigakuen; Masaaki Minakawa, Tokyo, both of Japan

[73] Assignee: Honda Giken Kogyo Kabushiki Kaisha, Tokyo, Japan

[21] Appl. No.: 163,918

[22] Filed: Mar. 3, 1988

Related U.S. Patent Documents

Reissue of:

[64] Patent No.: 4,620,720
Issued: Nov. 4, 1986
Appl. No.: 822,938
Filed: Jan. 27, 1986

U.S. Applications:

[63] Continuation of Ser. No. 576,307, Feb. 2, 1984, abandoned.

[30] Foreign Application Priority Data

Feb. 2, 1983 [JP] Japan ..... 58-15923
Feb. 2, 1983 [JP] Japan ..... 58-15924

[51] Int. Cl.[4] ..... B60G 3/02

[52] U.S. Cl. ..... 280/666; 280/670; 280/675; 280/69.3

[58] Field of Search ..... 280/666, 668, 670, 675, 280/69.3, 696, 701; 100/18 R, 18 A

[56] References Cited

U.S. PATENT DOCUMENTS

| | | | |
|---|---|---|---|
| 2,085,738 | 7/1937 | Coleman | 280/698 |
| 2,623,613 | 12/1952 | Booth | 188/18 R |
| 2,762,458 | 9/1956 | Goepfrich et al. | 188/18 R |
| 2,935,334 | 5/1960 | Felts | 280/666 |
| 2,967,066 | 1/1961 | Mueller | 280/692 |
| 3,917,308 | 11/1975 | Schulz | 280/668 |
| 4,341,396 | 7/1982 | Decouzon et al. | 280/666 |

FOREIGN PATENT DOCUMENTS

| | | | |
|---|---|---|---|
| 0026131 | 4/1981 | European Pat. Off. . | |
| 1755113 | 7/1971 | Fed. Rep. of Germany . | |
| 2148797 | 4/1973 | Fed. Rep. of Germany | 188/18 A |
| 3012873 | 10/1981 | Fed. Rep. of Germany . | |
| 2967066 | 1/1961 | Japan . | |
| 2935334 | 5/1980 | Japan . | |
| 1227094 | 3/1971 | United Kingdom . | |
| 1531177 | 11/1978 | United Kingdom . | |
| 2009682 | 6/1979 | United Kingdom | 280/668 |
| 2026404 | 2/1980 | United Kingdom | 280/668 |
| 2039259 | 8/1980 | United Kingdom . | |

OTHER PUBLICATIONS

*Motor Age*, Sep. 1976, pp. 61-64, "MacPherson Strut Suspensions".

*Primary Examiner*—Kenneth R. Rice
*Attorney, Agent, or Firm*—Armstrong, Nikaido, Mermelstein Kubovcik & Murray

[57] ABSTRACT

Disclosed is a strut type suspension for automobiles, consisting of a member for rotatably supporting a wheel, a lower control arm extending in the widthwise direction of a chassis and connected pivotably at its outer end to the support member, and a disc brake unit or internally expansible drum brake unit provided in the wheel. The disc brake unit is provided in its central portion with a recess opened to an inner side of the chassis, an outer end fixing portion of the lower control arm for connection to the support member being set in said recess so as to be close to the center line of ground contact of the wheel. In the above-mentioned strut type suspension for automobiles, which is provided with an internally expansible drum brake unit in a wheel, a support base to which an anchor block is fixed is formed on an inner side surface of a back plate of the drum brake unit so as to project inward therefrom, and a recess defined in an outer side surface of the back plate so as to deflect toward the projecting support base. An outer end fixing portion of the lower control arm, which is joined to the support member, is set in the recess so as to be close to the center line of ground contact of the wheel.

10 Claims, 5 Drawing Sheets

STRUT TYPE SUSPENSION FOR AUTOMOBILE

Matter enclosed in heavy brackets [ ] appears in the original patent but forms no part of this reissue specification; matter printed in italics indicates the additions made by reissue.

This application is a continuation of application Ser. No. 576,307 filed 2/2/84 now abandoned.

BACKGROUND OF THE INVENTION

1. Field of the Invention

This invention relates to a strut type suspension for automobiles, consisting of a member for rotatably supporting a wheel, a lower control arm extending in the widthwise direction of a chassis and connected pivotably at its outer end to the support member, and a disc brake unit or an internally expansible drum brake unit provided in the wheel.

2. Description of the Prior Art

In a conventional strut type suspension of this kind, as shown in FIG. 1, a distance δ between the center line 5 of ground contact of a wheel 1 and an outer end fixing portion 4 of a lower control arm 3 cannot be reduced to a lower level since a space for setting a disc brake unit 2, which is positioned in the vicinity of an axis of rotation of the wheel 1, and for mounting the outer end fixing portion of the lower control arm 3 is limited; the distance δ is generally as long as around 50–70 mm. Let W equal a road surface input working on the wheel 1 along the center line 5 of ground contact thereof, and L a distance between the outer end fixing portion 4 of the arm 3 and an upper mounting portion 8, which is joined to a chassis 7, of a strut damper 6. The reaction force F expressed by the first equation works on the upper mounting portion 8 of the strut damper 6.

$$F=\delta W/L \qquad (1)$$

Accordingly, when the distance δ is long, the bending moment (F·L) becomes large, so that the bending deformation occurs in a rod 9 of the strut damper 6. As a result, the rod 9 is moved frictionally in a shell 10, i.e. the former is not slid smoothly in the latter. This would give the driver a rough ride or cause noises to occur while the automobile runs. These problems are also encountered in such a strut type suspension for automobiles as having an internally expansible drum brake unit provided in a wheel 1.

SUMMARY OF THE INVENTION

An object of the present invention is to provide a strut type suspension for automobiles, which is free from the above-mentioned drawbacks encountered in a conventional strut type suspension of this kind, and which enables a strut damper to be operated smoothly, a driver to be given a more comfortable ride, and the occurrence of noises to be prevented.

In order to achieve this object, a first invention provides a strut type suspension for automobiles, having a member for rotatably supporting a wheel, a lower control arm extending in the widthwise direction of a chassis and connected pivotably at its outer end to the support member, and a disc brake unit provided in the wheel, the disc brake unit being provided in its central portion with a recess opened to an inner side of the chassis, an outer end fixing portion of the lower control arm for joining to the support member being so set in the recess as to be close to the center line of ground contact of the wheel.

A second invention provides a strut type suspension for automobiles, having a member for rotatably supporting a wheel, a lower control arm extending in the widthwise direction of a chassis and connected pivotably at its outer end to the support member, and an internally expansible drum brake unit provided in the wheel, the drum brake unit being provided with a back plate having on its inner side surface a projecting support base to which an anchor block is fixed, and in its outer side surface a recess deflecting toward the projecting support base, an outer end fixing portion of the lower control arm for joining to the support member being set in the recess so as to be close to the center line of ground contact of the wheel.

When a strut type suspension is constructed as described above, the bending moment working on a strut damper decreases, so that the frictional resistance of the strut damper decreases. This enables the strut damper to be operated smoothly, the driver to be given a more comfortable ride, and the occurrence of noises to be prevented.

The above and other objects as well as advantageous features of the invention will become apparent from the following description of the preferred embodiments taken in conjunction with the accompanying drawings.

BRIEF DESCRIPTION OF THE DRAWINGS

FIGS. 2 and 3 show a first embodiment of the present invention, wherein:

FIG. 2 is a longitudinal section of a principal portion; and

FIG. 3 is a sectional view taken along the line III—III in FIG. 2;

FIGS. 4–7 show another embodiment of the present invention, wherein:

FIG. 4 is a longitudinal section of a principal portion;

FIG. 5 is a sectional view taken along the line V—V in FIG. 4;

FIG. 6 is an enlarged sectional view of the portion of what is shown in FIG. 4 which is designated by an arrow VI therein; and FIG. 7 is a sectional view taken along the line VII—VII in FIG. 6.

DESCRIPTION OF THE PREFERRED EMBODIMENTS

Figure 1:
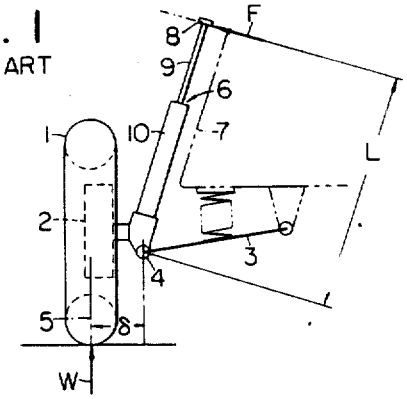
FIG. 1 PRIOR ART
FIG. 1 is a schematic diagram for describing problems encountered in a conventional strut type suspension.
Figure 2:
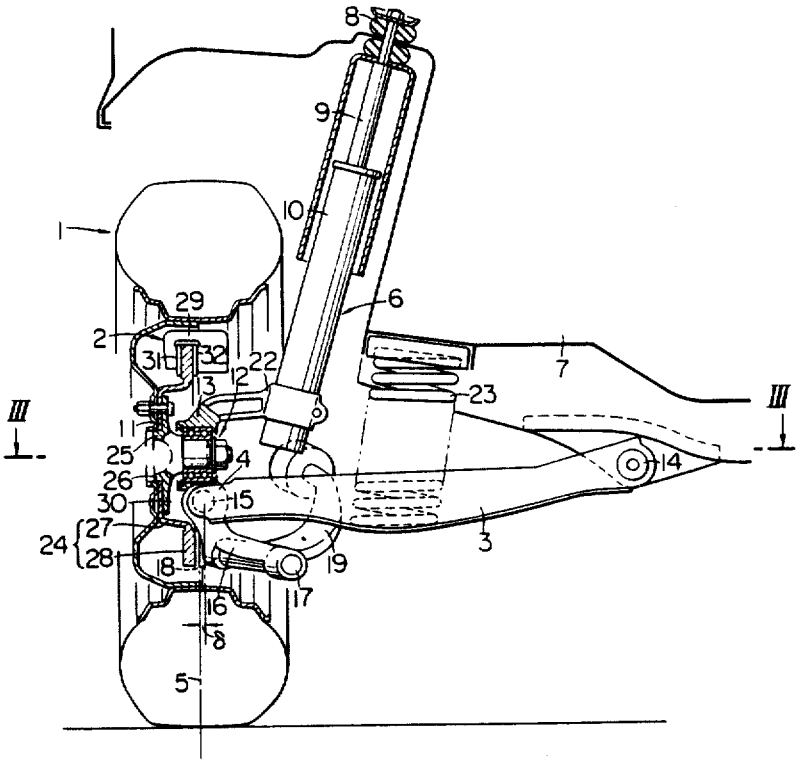
Figure 3:
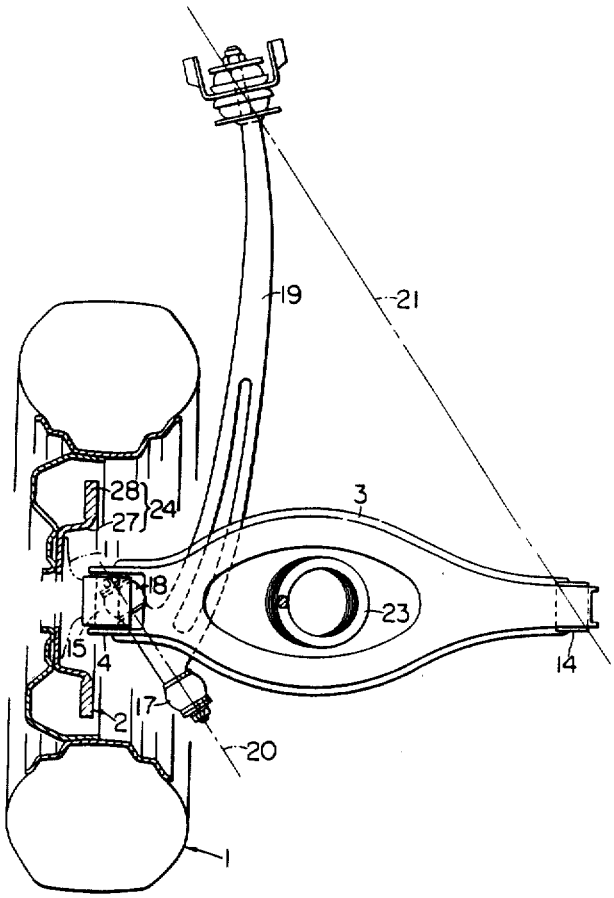
Figure 4:
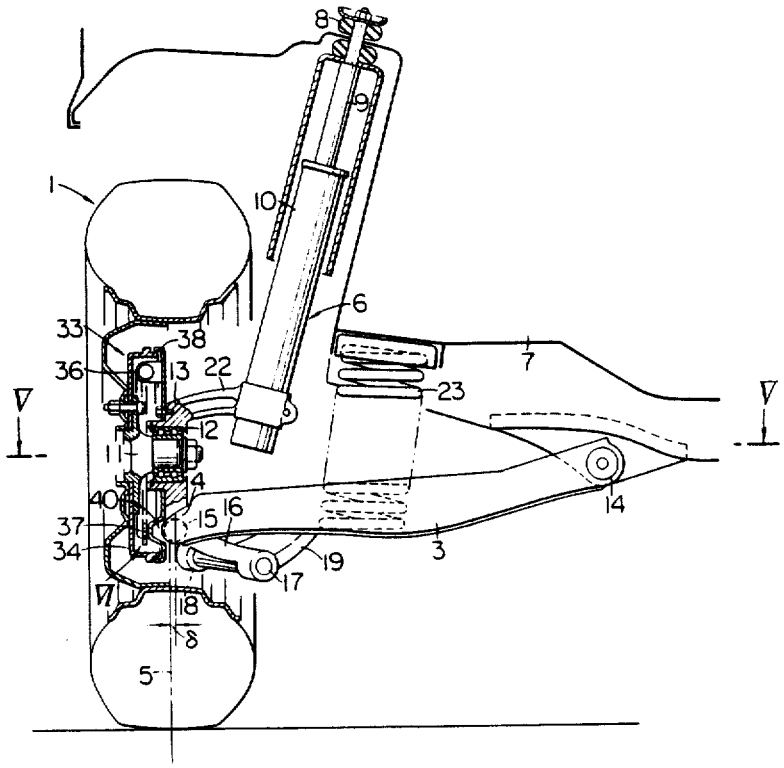
Figure 5:
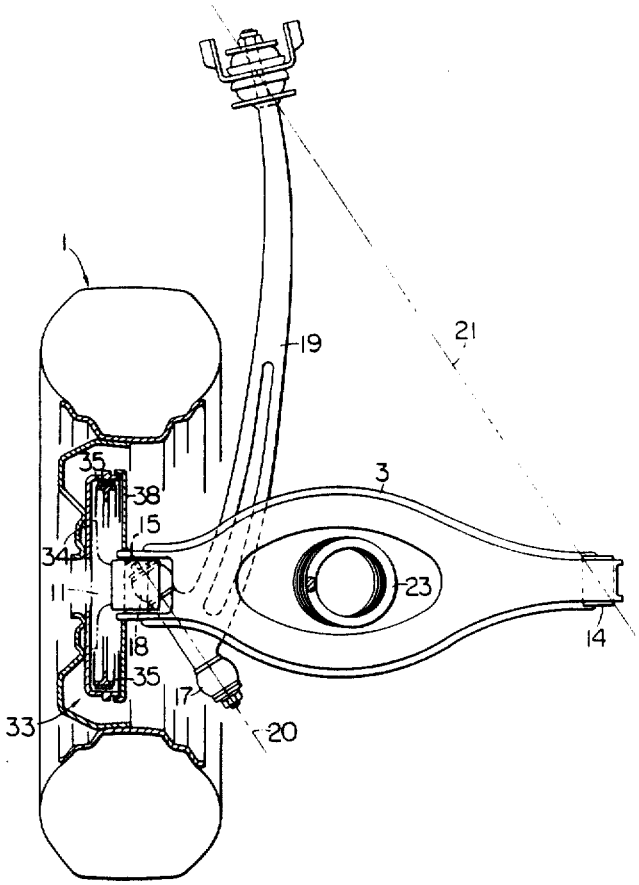
Figure 6:
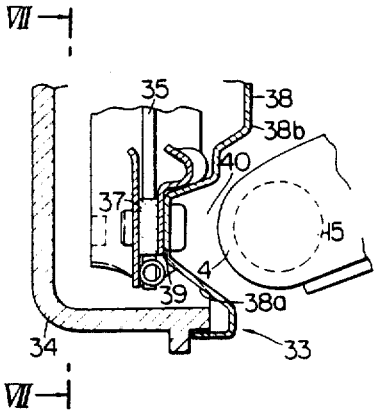
Figure 7:
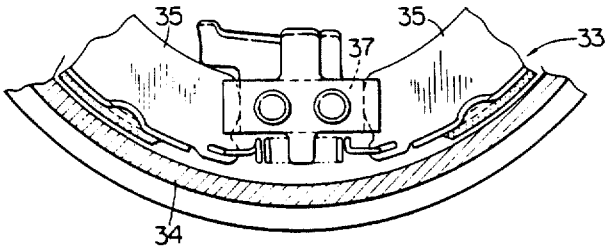

The embodiment of the present invention will now be described with reference to the drawings. Referring to FIGS. 2 and 3, which show an embodiment of the present invention, a hub 11 is fixed to the central portion of a wheel 1 and supported rotatably on a hub carrier 13, which serves as a support member therefor, via a bearing 12. A lower control arm 3 extending in the widthwise direction of a chassis 7 consists of a so-called I-arm, and is connected at its inner end (right end in FIGS. 2 and 3) to the chassis 7 via a bush 14 in such a manner that the lower control arm 3 can be moved pivotally around an axis parallel to the direction (direction perpendicular to the drawing surface of FIG. 2, or the vertical direction of FIG. 3) in which the automobile advances. On the other hand, an outer end of the lower control arm 3 is fixed pivotably to the hub carrier 13 via a single bush 15.

A bifurcated arm 16, which extends downward and inward so as to make an angle to the axis of rotation of the wheel 1, is provided at a lower portion of the hub carrier 13 and formed unitarily therewith. A radius rod 19 is connected pivotably at its one end to end portions of the bifurcated arm 16 via a pair of bushes 17, 18. The radius rod 19 extends substantially in the horizontal direction, and is connected pivotably at the other end thereof to the chassis 7. A toe of the wheel 1 is restricted by the two bushes 17, 18 and radius rod 19. Thus, even if sufficient longitudinal compliance is given to the wheel 1, toe variations, which adversely affect the steering stability, is not influenced. In order to reduce toe variations due to the vertical stroke of the suspension to an extremely low level, an axis 20 of the two bushes 17, 18 and a straight line 21 connecting the chassis-connected end of the radius rod 19 and inner end of the lower control arm 3 are set substantially parallel to each other.

The hub carrier 13 is provided at its upper portion with an arm 22 formed integrally therewith, to which a lower portion of a shell 10 of the strut damper 6 is fixedly connected. A rod 9 of the strut damper 6 extends upward, and is joined at its upper end portion to the chassis 7 via an upper mounting member 8. A spring 23 is provided between an intermediate portion of the lower control arm 3 and the chassis 7. Instead of providing the spring 23 between the lower control arm 3 and chassis 7, a spring may be provided between the shell 10 of the strut damper 6 and an upper end portion of the rod 9 so as to surround the rod 9.

A disc brake unit 2 is provided in the wheel 1. A disc 24 of the disc brake unit 2 consists of a bottomed, cylindrical support portion 27 having at its bottom section a bore for fitting an annular projection 25 of the hub carrier 13 therein, and a rotor portion 28 extending radially in the outward direction from an open end of the support portion 27, the disc 24 being formed generally in the shape of a dish. Calipers 29, which are provided with a pair of pads 31, 32 for holding the rotor portion 28 from both surfaces thereof, and a piston for driving the pads 31, 32, are provided on an outer circumference of the rotor portion 28. In this arrangement, the disc brake unit 2 is provided in its central portion with a recess 30 opened to the inner side of the chassis.

According to the present invention, the lower control arm 3 is so designed that an outer end fixing portion 4 thereof which is joined to the hub carrier via a bushing 15 is positioned in the recess 30. This enables a distance δ between the center line 5 of ground contact of the wheel 1 and outer end fixing portion 4 to be set extremely short, i.e. to be around from zero to several millimeters as may be understood clearly from the drawings. In order to set the outer end fixing portion 4 in the recess 30 easily, the hub 11 is inserted into an inner race of the bearing 12.

The operation of this embodiment will now be described. Since the distance δ is set extremely short as mentioned above, the reaction force F, which is determined on the basis of the first equation referred to above and which works on the upper end portion of the rod 9 of the strut damper 6, becomes small. Accordingly, the bending moment working on the rod 9 becomes small. This enables the rod 9 to be slid smoothly in the shell, the driver to be given a more comfortable ride, and the occurrence of noises to be minimized.

FIGS. 4–7 show another embodiment of the present invention, in which the parts corresponding to those of the previously-described embodiment are designated by the same reference numerals. An internally expansible drum type brake unit 33 is provided in a wheel 1. A brake drum 34 of the drum brake unit 33 is fixed unitarily to a hub 11, so that the brake drum 34 is rotated with the wheel 1. A pair of crescent-shaped shoes 35 are provided on the inner side of the brake drum 34, the former being adapted to press-contact an inner surface of the latter. One end of each of these crescent-shaped shoes 35 is engaged with and supported on an anchor block 37. A cylinder 36 is connected to the other end of each of the shoes 35. When the cylinder 36 is driven, the crescent-shaped shoes 35 are turned around the fulcrum anchor block 37 in the directions in which the cylinder-connected ends of the shoes 35 are moved away from each other, to press-contact the inner surface of the brake drum 34. A projecting support base 39 is formed on an inner side surface 38a of a back plate 38 for fixing the anchor block 37 to the plate 38. A recess 40 defined by the support base 39 is provided in an outer side surface 38b of the back plate 38.

According to the present invention, the outer end fixing portion 4, which is joined to the hub carrier 13 via the bushing 15, of the lower control arm 3 is set so as to be positioned in the recess 40. This enables a distance δ between the center line 5 of ground contact of the wheel 1 and outer end fixing portion 4 to be extremely short, i.e. to be around from zero to several millimeters as may be clearly understood from the drawing. In order to set the outer end fixing portion 4 in the recess 40 easily, the hub 11 is so constructed that it can be inserted into an inner race of the bearing 12.

The operation of the second embodiment will now be described. Since a distance δ is set extremely short as mentioned above, the reaction force F, which is determined on the basis of the first equation and which works on the upper end portion of the rod 9 in the strut damper 6, becomes small so that the bending moment working on the rod 9 becomes small. This enables the rod 9 to be slid smoothly in the shell 10, the driver to be given a more comfortable ride, and the occurrence of noises to be minimized, in the same manner as in the previously-described embodiment.

The present invention is not, of course, limited to the above embodiments; it may be modified in various ways within the scope of the appended claims.

What is claimed is:

1. A strut type suspension for automobiles having a chassis, comprising a support member for rotably supporting a wheel, a lower control arm extending in the widthwise direction of the chassis and connected pivotably at its outer *end to said support member, a radius rod having one and other* ends and extending substantially in a longitudinal direction of said chassis with the one end thereof pivotably connected to the chassis, and a brake unit in said wheel, said brake unit being in a central portion of said wheel with a recess opened to an inner side of said chassis, said support member having an integral member extending inwardly and downwardly of said chassis and connected with the other end of said radius rod, the outer end of said lower control arm pivoted to the support member extending into said recess so that said pivot is located close to the center line contact of said wheel with the ground.

2. A strut type suspension as set forth in claim 1, wherein said integral member has a predetermined length with opposite ends, said radius rod being pivotably connected at the other end thereof to said opposite ends of the integral member.

3. A strut type suspension as set forth in claim 1 or 2, wherein said integral member is formed into a bifurcated arm.

4. A strut type suspension as set forth in claim 1, wherein said lower control arm is formed as an I-arm.

5. A strut type suspension as set forth in claim 1, further comprising a shock absorber having a strut damper and a spring, said spring being interposed between said chassis and said lower control [are] *arm* separately from said strut damper.

6. A strut type suspension as set forth in claim 5, wherein said strut damper has an operation axis and is disposed between said chassis and said support member, said axis of the damper being located closer to the connection of said lower control arm to the chassis than said pivot of said [control] *arm to* said support member.

7. A strut type suspension as set forth in claim 1, wherein said brake unit is a disc brake.

8. A strut type suspension as set forth in claim 1, wherein said brake unit is an internally expansible drum brake which includes a back plate having on an inner side surface thereof a projecting support base to which an anchor block is fixed, said back plate further having an outer side surface on which said recess is provided deflecting toward said projecting support base.

9. A strut type suspension as set forth in claim 1, 7 or 8 wherein said support member comprises a hub fixed to said wheel and a hub carrier connected with said outer end of lower control arm, said hub having a central protrusion projecting inwardly into said recess, said hub carrier *being relatively rotatably fitted around said central* protrusion of the hub with a bearing means interposed therebetween.

10. A strut type suspension as set forth in claim 9, wherein the center line of ground contact of said wheel passes through said bearing means and said pivot is disposed directly below said bearing means.

* * * * *